(12) United States Patent
Koh

(10) Patent No.: US 7,450,176 B2
(45) Date of Patent: Nov. 11, 2008

(54) IMAGE DISPLAYER WITH MULTI-SCREEN FUNCTION

(75) Inventor: Hyung-il Koh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 10/714,613

(22) Filed: Nov. 18, 2003

(65) Prior Publication Data
US 2004/0109084 A1 Jun. 10, 2004

(30) Foreign Application Priority Data
Nov. 18, 2002 (KR) ............... 10-2002-0071667

(51) Int. Cl.
H04N 5/66 (2006.01)
(52) U.S. Cl. .................................... 348/383
(58) Field of Classification Search ............... 348/383, 348/581, 563–565, 588, 473–479, 576; 345/1.1–3.4
See application file for complete search history.

(56) References Cited

U.S. PATENT DOCUMENTS

| | | | | |
|---|---|---|---|---|
| 4,800,376 A * | 1/1989 | Suga et al. | ................. | 345/1.3 |
| 5,402,187 A * | 3/1995 | Ezaki | ................. | 348/474 |
| 5,617,147 A * | 4/1997 | Ezaki | ................. | 348/461 |
| 5,871,439 A * | 2/1999 | Takahashi et al. | ............ | 600/118 |
| 6,501,441 B1 * | 12/2002 | Ludtke et al. | ................. | 345/1.1 |
| 2004/0027483 A1 * | 2/2004 | Gurley et al. | ............... | 348/528 |
| 2004/0100578 A1 * | 5/2004 | Park | ....................... | 348/432.1 |

FOREIGN PATENT DOCUMENTS

| | | |
|---|---|---|
| JP | 9-284781 A | 10/1997 |
| JP | 2000-242248 A | 9/2000 |
| WO | WO 01/95618 A1 | 12/2001 |

* cited by examiner

*Primary Examiner*—M. Lee
(74) *Attorney, Agent, or Firm*—Sughrue Mion, PLLC

(57) ABSTRACT

An image displayer of a multi-screen system, which is comprised of at least two image displayers. The image displayer comprises a screen, a video decoder for performing an analog-to-digital conversion with respect to a video input signal, and a scaler for selecting a video signal corresponding to a predetermined area of the screen from video signals outputted from the video decoder by an externally transmitted control signal, and enlarging the selected video signal according to a size of the screen. Accordingly, the image displayer does not require an extra signal separator when constituting a multi-vision system and is not limited in number. Also, the image displayer can be used to receive a general broadcasting channel when it is not in use for the multi-vision system.

15 Claims, 6 Drawing Sheets

IMAGE DISPLAYER WITH MULTI-SCREEN FUNCTION

CROSS-REFERENCE TO RELATED APPLICATIONS

This application claims the benefit of Korean Application No. 2002-71667, filed Nov. 18, 2002, in the Korean Intellectual Property Office, the disclosure of which is incorporated herein by reference.

BACKGROUND

1. Field of the Invention

The present invention relates to an image displayer, and more particularly, to an image displayer which performs a multi-screen function without requiring an extra video signal separator.

2. Description of the Related Art

Image displayers such as a television set and a PDP (Plasma Display Panel) have a screen or display portion varying in size from 30 inches to 60 inches, and are generally used at home. The size of such an image displayer limits the place of its use, and accordingly it is difficult to use it for purposes such as advertising and election campaigning. In order to overcome this drawback, a video signal separator is used, for allowing a single image to be displayed on a plurality of connected image displayers. Generally, the video signal separator properly distributes a single video signal to the plurality of image displayers to thus have a single image displayed on a large screen.

FIG. 1 is a block diagram showing a multi-screen system using a conventional video signal separator.

The multi-screen system as shown in FIG. 1 has a video signal separator 10 and a plurality of image displayers 21-24 for displaying respectively assigned views according to the distributed signal.

The video signal separator 10 separates a video signal supplied from a video cassette recorder, a tuner, and other video sources into four (4) video signals. The separated video signals are processed so that they can be displayed on the image displayers 21-24 in a single full-screen. In order to enlarge each video signal to a full-screen size, the video signal separator 10 has to have a corresponding function. Also, the multi-screen system has to have a processor to operate four (4) screens for a 2×2 multi-screen system or sixteen (16) screens for a 4×4 multi-screen system in a full-screen. Accordingly, the conventional multi-screen system requires an expensive video signal separator 10 to realize the large sized screen. Furthermore, the large sized screen cannot be realized if output ports provided in the video signal separator 10 do not match with the plurality of image displayers in number.

SUMMARY

The present invention has been developed in order to solve the above problems in the related art. Accordingly, an aspect of the present invention provides an image displayer capable of realizing a large sized screen without requiring an extra signal separator and in an unlimited number of screens.

In order to achieve the above aspect and/or other features of the present invention, an image displayer of a multi-screen system comprises at least two image displayers. The image displayer comprises a screen or display portion, a video decoder for performing an analog-to-digital conversion with respect to a video input signal, and a scaler for selecting a video signal corresponding to a predetermined area of the screen from video signals outputted from the video decoder by an externally transmitted control signal, and enlarging the selected video signal according to a size of the screen.

The signal selecting unit comprises a frame buffer for being inputted with the video signal outputted from the video decoder and storing the video signal for a predetermined time, and then outputting the video signal to the scaling unit, a set value storing unit for storing a set value for the multi-screen function, and a frame buffer control unit for selecting a predetermined area of the video signal of the video decoder stored in the frame buffer in response to one of the set values stored by the set value storing unit.

The image displayer further comprises a control unit for selecting one of the plurality of set values stored in the set value storing unit in response to an externally transmitted control signal.

The image displayer further comprises an OSD unit for displaying a predetermined font on the screen according to the control signal supplied from the control unit, and controlling the multi-screen function on an OSD window.

The externally transmitted control signal is generated by a setting key attached to a remote controller and the image displayer.

Also, the above aspect is achieved by providing an image displayer comprising a video decoder for performing an analog-to-digital conversion with respect to a video input signal; a video signal selecting unit for selecting a video signal outputted from the video decoder to display in a predetermined area of a screen in response to an externally transmitted control signal; a frame buffer for receiving the video signal selected by the video signal selecting unit and re-ordering the video signal by the order of input, and a scaler for scaling the video signal re-arranged by the frame buffer.

The video signal selecting unit comprises a first selecting unit for selecting a predetermined area of a video signal added to a horizontal sync signal of the video input signal converted from analog to digital by the video decoder, and a second selecting unit for selecting a predetermined area of a video signal added to a vertical sync signal of the video input signal converted from analog to digital by the video decoder.

The first selecting unit comprises a first initial value storing unit for storing a plurality of initial values for the selection of the predetermined area of the video signal outputted from the video decoder and added to the horizontal sync value, a first multiplexer for selecting one of the initial values stored in the first initial value storing unit in response to the externally transmitted control signal, a first counter for generating a pulse of a predetermined period based on the initial value selected by the first multiplexer; and a first exclusive OR gate for performing a masking with respect to the video signal outputted from the video decoder using the pulse outputted from the first counter and outputting only a desired area of the video signal.

The second selecting unit comprises a second initial value storing unit for storing a plurality of initial values for the selection of the predetermined area of the video signal outputted from the video decoder and added to the vertical sync signal, a second multiplexer for selecting any one value of the initial values stored in the second initial value storing unit in response to the control signal from the external device, a second counter for generating a pulse of a predetermined period according to the initial value selected by the second multiplexer; and a second exclusive OR gate for performing a masking with respect to the video signal outputted from the video decoder, using the pulse output from the second counter, thereby outputting only a desired area of the video signal.

The image displayer further comprises an OSD unit for displaying a predetermined font on the screen in response to the externally transmitted control signal so that the multi-screen function can be controlled on the OSD.

BRIEF DESCRIPTION OF THE DRAWINGS

The above aspect and other features of the present invention become more apparent by describing non-limiting, illustrative embodiments of the present invention with reference to the accompanying drawings, in which.

DESCRIPTION OF THE EXEMPLARY EMBODIMENTS

Figure 1:
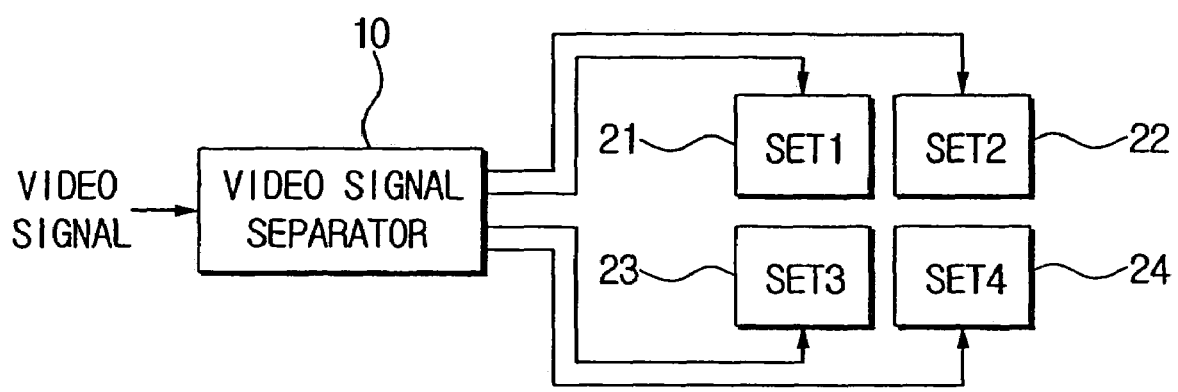
FIG. 1 is a block diagram showing a multi-screen system using a conventional video signal separator.
Figure 2:
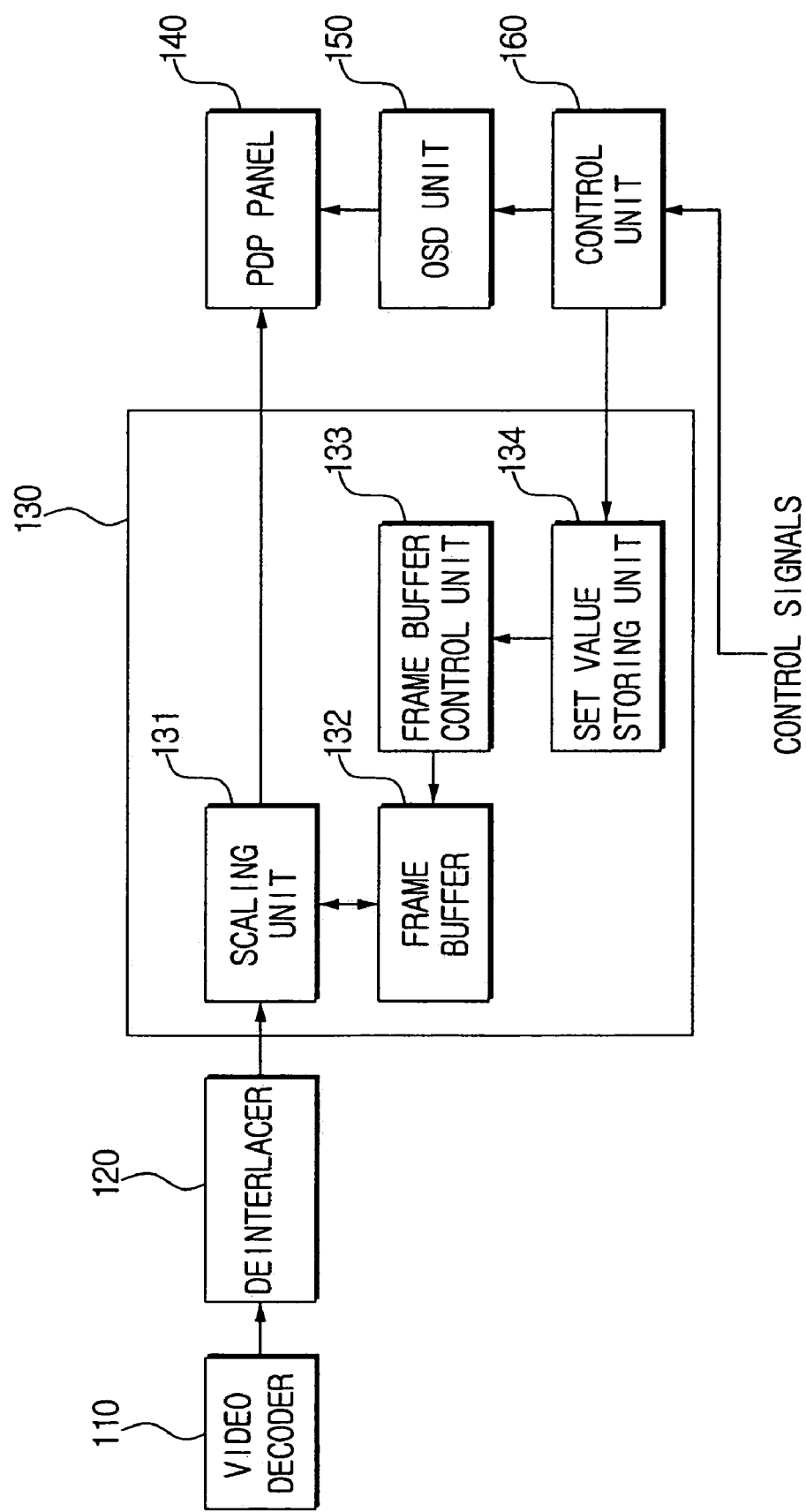
FIG. 2 is a block diagram showing an image displayer having a screen control function according to a first illustrative, non-limiting embodiment of the present invention.

FIG. 2 is a block diagram showing an image displayer having a screen control function according to a first non-limiting, illustrative embodiment of the present invention.

The image displayer as shown in FIG. 2 includes a video decoder 110, a deinterlacer 120, a scaler 130, a PDP panel 140, an OSD unit 150, and a control unit 160.

The video decoder 110 performs an analog-to-digital conversion with respect to video signals (not in digital form) supplied from a broadcasting station, a video cassette recorder, and other video sources.

The deinterlacer 120 converts the video signals digitalized by the video decoder 110 in a progressive method.

The scaler 130 converts the digital video signal, which is converted in the progressive method and outputted from the deinterlacer 120, in accordance with a resolution of the PDP panel 140. Also, the scaler 130 is controlled by the control unit 160 in response to a control signal generated from an external device such as a remote controller (not shown), selects only a predetermined area of the digital video signal outputted from the deinterlacer 120, scales the predetermined area, and outputs it to the PDP panel 140. Accordingly, since the image displayer using the scaler 130 displays only the predetermined area of the digital video signal through the PDP panel 140, it can be adopted in a multi-screen system (e.g. multi-vision system) constructed of a plurality of image displayers.

The control unit 160 controls the scaler 130 in response to control signals sel1 to sel4 generated from the external device such as the remote controller (not shown). Also, the control unit 160 controls the OSD unit 150 in response to the control signals sel1 to sel4 to display a predetermined text and a predetermined menu on the PDP panel 140. Here, the control signals are to select any one of 2×2, 4×4, and 8×8 multi-screen systems and select a reproducing area in the selected system.

The On-Screen Display (OSD) unit 150 has a font and a menu stored therein, for being displayed on the PDP panel 140, and is controlled by the control unit 160 to display the font and the menu on the PDP panel 140.

Preferably, the scaler 130 includes a scaling unit 131, a frame buffer 132, a frame buffer control unit 133, a set value storing unit 134. Next, the scaler 130 will be described below with reference to FIGS. 3A and 3B.

The scaling unit 131 enlarges the digital video signal output from the deinterlacer 120 in accordance with the resolution of the PDP panel 140. At this time, prior to enlarging the input digital video signal, the scaling unit 131 sends it to the frame buffer 132 to thus delay it for a predetermined delay time. After that, the scaling unit 131 receives the digital video signal back from the frame buffer 132 and enlarges it.

The frame buffer 132 holds the digital video signal supplied from the scaling unit 131 for the predetermined delay time and outputs it to the scaling unit 131. Meanwhile, the set value storing unit 134 is controlled by the control unit 160 in response to the control signal to output one of pre-stored set values to the frame buffer control unit 133. The set value storing unit 134 stores the data about the reproducing area of the image displayer constructing the multi-screen system corresponding to the control signal, and also the data about the corresponding screen size.

Figure 3A:
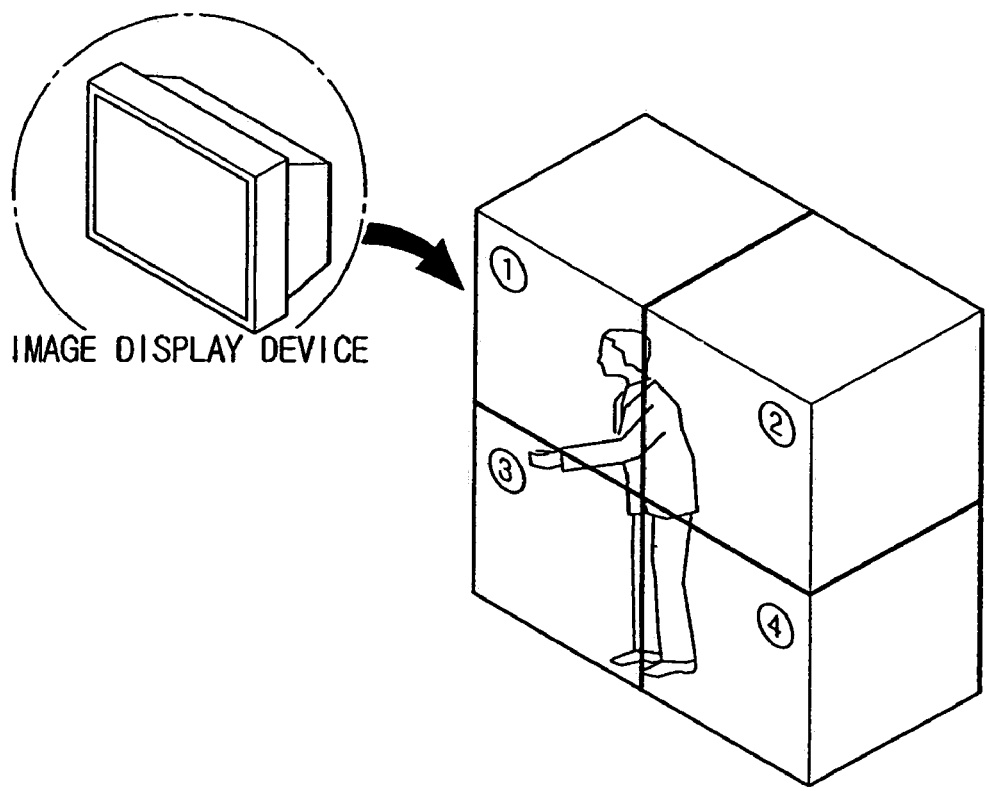
FIGS. 3A and 3B are views for explaining the operations of the set value storing unit and a frame buffer controlling unit.
Figure 3B:
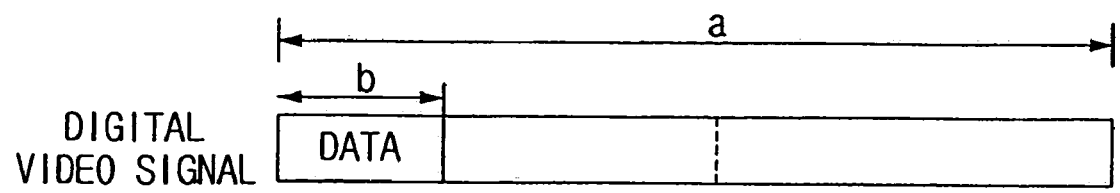

For example, when the PDP panel 140 of the image displayer is positioned at the position no. 1 of the multi-screen system as shown in FIG. 3A, the scaler 130 selects one of the digital video signals supplied thereto corresponding to the position no. 1 and reproduces the selected digital video signal through the PDP panel 140 in full-screen. The scaler 130 selects and scales an area "b" of the digital video signal "a" as shown in FIG. 3B, and then displays it on the PDP panel 140. Accordingly, the set value storing unit 134 transmits information to the frame buffer control unit 133, informing that the multi-screen system is a 4×4 system and the digital video signal is displayed at the position no. 1 of the multi-screen system. In response to the received information, the frame buffer control unit 133 controls the frame buffer 132 to transmit only ¼ of the digital video signal stored in the frame buffer 132 to the scaling unit 131. Likewise, in case of the 8×8 multi-screen system, the area "b" corresponds to ⅛ of the video signal stored in the frame buffer 132.

Figure 4:
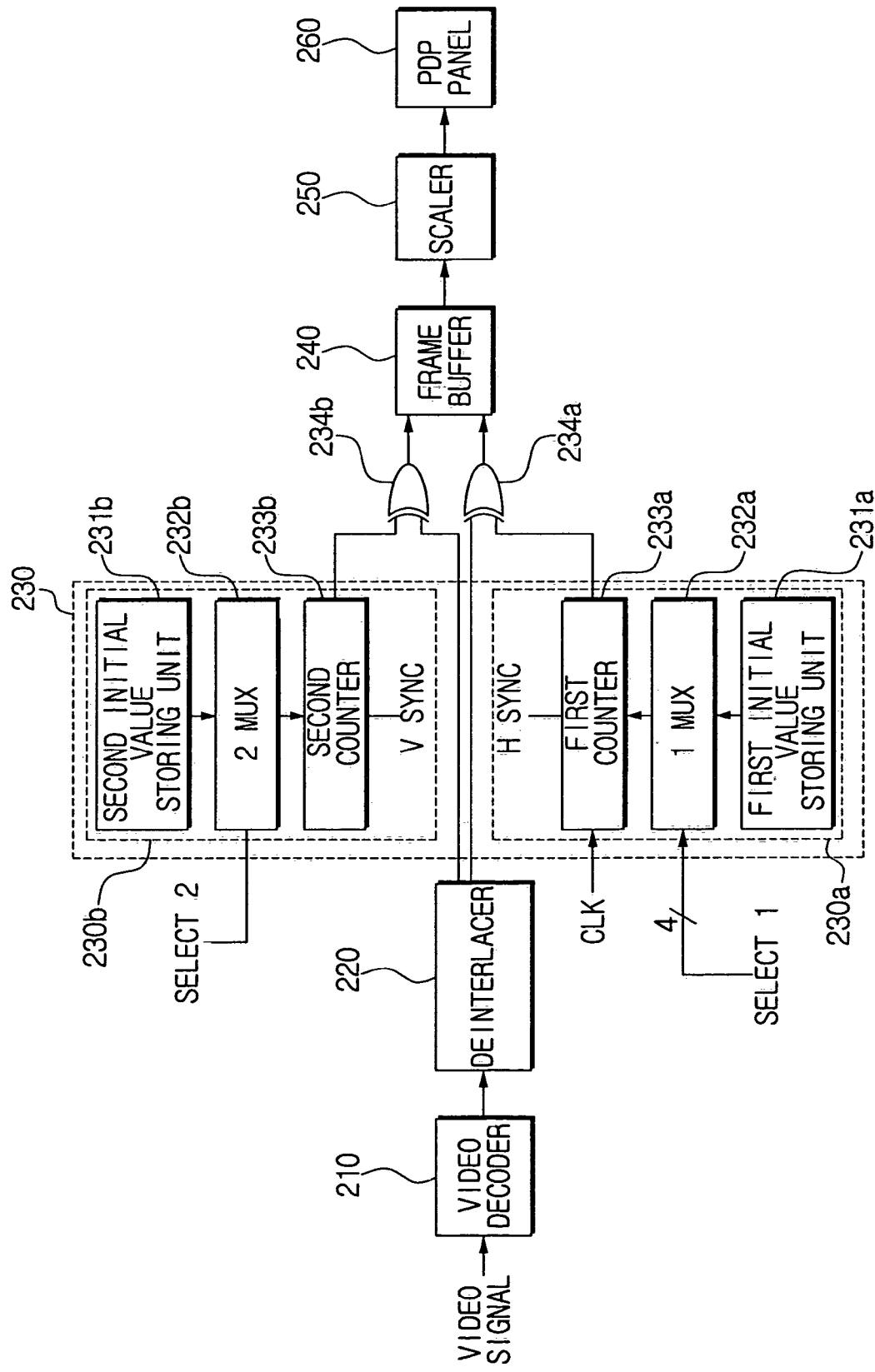
FIG. 4 is a block diagram showing an image displayer having a multi-screen function according to a second non-limiting, illustrative embodiment of the present invention.

FIG. 4 is a block diagram showing an image displayer according to a second illustrative, non-limiting embodiment of the present invention.

The image displayer as shown in FIG. 4 includes a video decoder 210, a deinterlacer 220, a video signal selecting unit 230, a frame buffer 240, a scaler 250, and a PDP panel 260.

In regard to the elements identical to those of the first illustrative, non-limiting embodiment, description will be omitted.

The video signal selecting unit 230 selects the digital video signals outputted from the deinterlacer 220 based on a horizontal sync signal Hsync and a vertical sync signal Vsync. That is, the video signal selecting unit 230 selects predetermined areas of the digital video signals added to the horizontal sync signal Hsync and the vertical sync signal Vsync.

The frame buffer 240 integrates the digital video signals selected by the video signal selecting unit 230 based on the horizontal sync signal Hsync and the vertical sync signal Vsync into a single digital video signal.

The scaler 250 enlarges the digital video signal stored in the frame buffer 240 according to the resolution of the PDP panel 260 and outputs it to the PDP panel 260.

The video signal selecting unit 230 has a first selecting unit 230a and a second selecting unit 230b.

The first selecting unit 230a selects a digital video signal added to the horizontal sync HSYNC. For example, if a digital video signal corresponding to 720 pixels is located between the horizontal signals and the image displayer is positioned at the position no. 1 of a 4×4 multi-screen system (Refer to FIG. 3A), the image displayer requires only 180 pixels of 720 pixels of the digital video signal located between the horizontal sync signals Hysnc. That is, the first selecting unit 230a selects only the 180 pixels of a front area of the digital video signal added to the horizontal sync signal Hsync.

The second selecting unit 230b selects a digital video signal added to the vertical sync signal Vsync. For example, if a single video frame is comprised of 720×480 lines and the image displayer is positioned at the position no. 1 of a 4×4 multi-screen system, the image displayer selects 120 of 480 vertical sync signals based on the initial vertical sync signal Vsync.

The first selecting unit 230a has a first initial value storing unit 231a, a first multiplexer 1MUX 232a, a first counter 233a, and a first exclusive OR gate 234a. The first exclusive OR gate 234a is only exemplary and other implementations that perform a similar function could be devised.

Figure 5A:
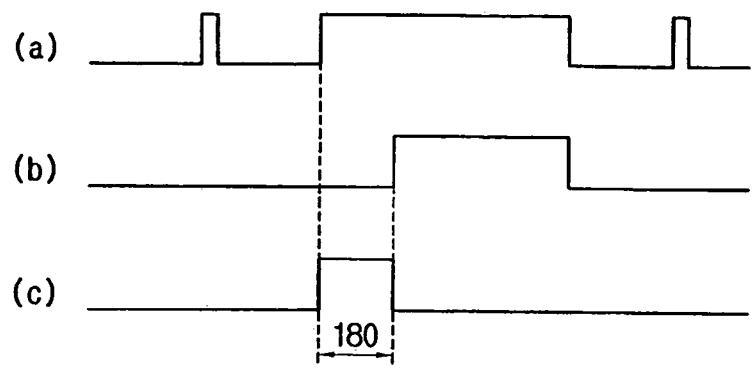
FIGS. 5A, 5B and 5C are views showing output waves of the first counter and the exclusive OR gate of a logic device of FIG. 4.

Referring now to FIG. 5A, when the image displayer is adopted in the multi-screen system, the first initial value storing unit 231a stores set values according to an aspect ratio required for use in the multi-screen system. The first multiplexer 1MUX 232a selects one of the set values stored in the first value storing unit 231a in response to a control signal (select 1) generated from an external device such as a remote controller, and outputs the set value to the first counter 233a. In response to the set value output from the first multiplexer 1MUX 232a, the first counter 233a outputs a pulse of a predetermined width. In here, the set value contains information about the time the first counter 233a starts counting a reference clock CLK and finishes the counting. Illustrated by (b) of FIG. 5A is a pulse that is outputted from the first counter 233a when the image displayer displays the position no. 1 area of the 4×4 multi-screen system. As shown in FIG. 5A, the first counter 233a counts the reference clock CLK by N times according to the set value inputted from the first multiplexer 1MUX 232a, and then outputs the "high" logic pulse. Consequently, the exclusive OR gate 234a supplied with output pulses of the deinterlacer 220 and the first counter 233a performs a masking with respect to the digital video signal as shown in (a) of FIG. 5A and outputs the pulse as shown in (c) of FIG. 5B to the frame buffer 240.

Figure 5B:
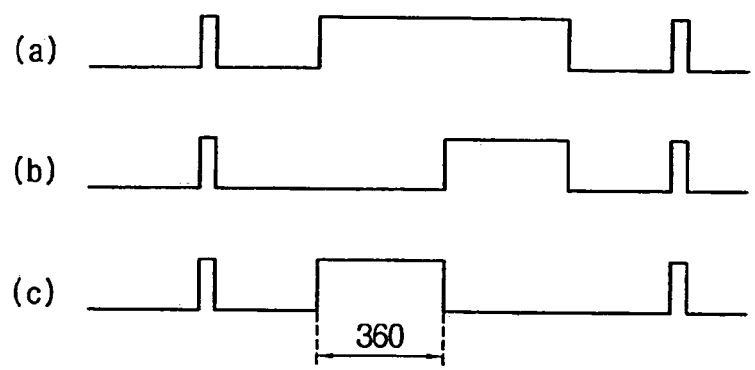
Figure 5C:
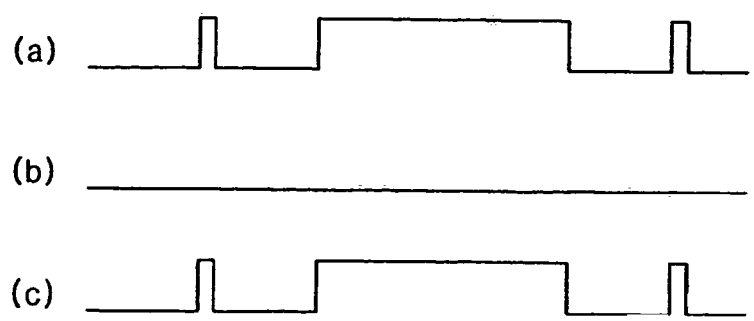

FIG. 5B shows the pulse outputted from the first counter 233a when the image displayer is employed in the 2×2 multi-screen system. As shown in FIG. 5B, the first counter 233a performs a masking with respect to ½ of a rear portion of the digital video signal, and supplies the pulse as shown in (c) of FIG. 5B to the exclusive OR gate 234a. FIG. 5C shows the pulse outputted from the first counter 233a when the image displayer is not adopted in the multi-screen system. In this case, the first counter 233a outputs the "low" logic pulse so that the entire digital video signal is displayed on the PDP panel 260.

The second selecting unit 230b has a second initial value storing unit 231b, a second multiplexer 2MUX 232b, and the second counter 233b.

The second initial value storing unit 231b has counter values according to a display area required when the image displayer is adopted in the multi-screen system. The second multiplexer 2MUX 232b supplies to the second counter 232b one of the set values stored in the second initial value storing unit 231b in response to a control signal (select 2) generated from the external device such as the remote controller (not shown). In response to the set value supplied from the second multiplexer 2MUX 232b, the second counter 233b selects the vertical sync signal and a predetermined area of the digital video signal added to the vertical sync signal. In here, the set value, which is supplied to the second counter 233b from the second initial value storing unit 231b through the second multiplexer 2MUX 232b, contains information about the time the second counter 233b starts and finishes counting. The second exclusive OR gate 234b performs masking with respect to the digital video signal outputted from the deinterlacer 220, using the pulse outputted from the second counter 233b, and outputs the digital video signal to the frame buffer 240.

Figure 6:
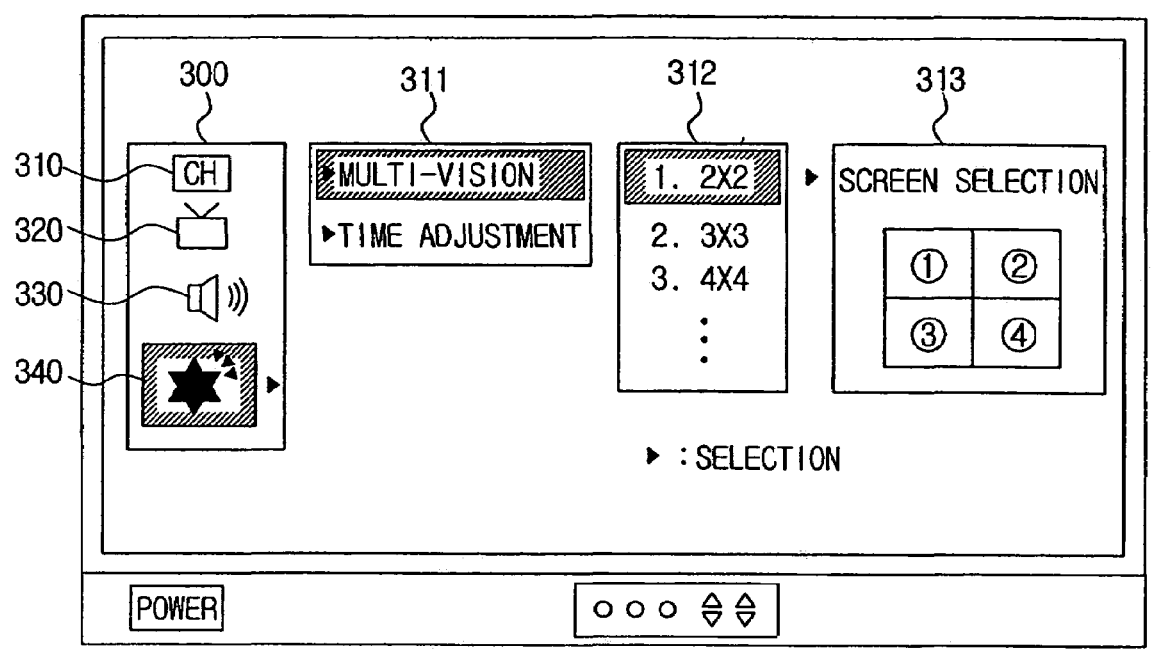
FIG. 6 is a view showing an example of an OSD window for the setting of the image displayer.

FIG. 6 is an example of an OSD menu for setting the image displayer.

As shown in FIG. 6, the OSD menu has a channel setting menu 310, an image quality setting menu 320, a sound menu 330, and other menus 340. The multi-screen function is included in other menus 340. When other menus 340 are selected through a setting key attached on a remote controller (not shown) or the image displayer, menus for multi-vision and time adjustment are displayed. Next, with the selection of the multi-vision, a sub-menu window 312 is displayed, asking the selection of the multi-screen system. When the 2×2 multi-screen system is selected, a menu is displayed, asking which position the image displayer is placed. As described above, the image displayer does not require an expensive signal separator because the multi-screen function can be performed through the menus, and can avoid the possible problem which is caused when the number of the image displayers does not correspond to the output ports of the signal separator.

As described above, in the N×N multi-screen system, the image displayer of the present invention does not require the separate signal separator and is not limited in number. Also, when the image displayer is not in use for the multi-screen system, it can be used as a general image displayer for receiving broadcasting signals.

Although illustrative, non-limiting embodiments of the present invention have been described for illustrative purposes, those skilled in the art will appreciate that various modifications, additions and substitutions are possible, without departing from the scope and spirit of the invention as disclosed in the accompanying claims.

What is claimed:

1. An image displayer of a multi-screen system, wherein said multi-screen system is comprised of at least two image displayers, each image displayer comprising:
   a display; and
   a scaler for selecting a video signal corresponding to a predetermined area of the display based on an externally transmitted control signal, and enlarging the selected video signal according to a size of the display.

2. The image displayer of claim 1, wherein the sealer comprises:
   a signal selecting unit for selecting a predetermined area of the video signal; and
   a scaling unit for enlarging the video signal selected by the signal selecting unit according to the size of the display.

3. The image displayer of claim 2, wherein the signal selecting unit comprises:
   a buffer for storing the video signal for a predetermined time, and then outputting the video signal to the scaling unit;
   a set value storing unit for storing a plurality of set values for the multi-screen function; and a buffer control unit for selecting the predetermined area of the video signal stored in the buffer in response to one of the plurality of set values stored in the set value storing unit.

4. The image displayer of claim 3, further comprising a control unit for selecting one of the plurality of set values stored in the set value storing unit in response to an externally transmitted control signal.

5. The image displayer of claim 4, further comprising an On-Screen Display OSD unit for displaying a predetermined font on the display according to the control signal, and controlling the multi-screen function on an OSD window.

6. The image displayer of claim 5, wherein the control signal is generated by a setting key attached to a remote controller or the image displayer.

7. The image displayer of claim 1, further comprising a video decoder for performing an analog-to-digital conversion with respect to the video signal and outputting the video signal to the scaler.

8. An image displayer of a multi-screen player, wherein said multi-screen player is comprised of at least two image displayers, each of the at least two image displayers comprising:
a video signal selecting unit for selecting a video signal to display in a predetermined area of a display in response to externally transmitted control signals;
a buffer for receiving the video signal selected by the video signal selecting unit and re-ordering the video signal by an order of input; and
a scaler for scaling the video signal re-arranged by the buffer.

9. The image displayer of claim 8, wherein the video signal selecting unit comprises:
a first selecting unit for selecting a predetermined area of the video signal added to a horizontal sync signal of the video signal; and
a second selecting unit for selecting a predetermined area of the video signal added to a vertical sync signal of the video signal.

10. An image displayer comprising:
a video signal selecting unit for selecting a video signal to display in a predetermined area of a display in response to externally transmitted control signals;
a buffer for receiving the video signal selected by the video signal selecting unit and re-ordering the video signal by an order of input; and
a scaler for scaling the video signal re-arranged by the buffer
wherein the video signal selecting unit comprises:
a first selecting unit for selecting a predetermined area of the video signal added to a horizontal sync signal of the video signal; and
a second selecting unit for selecting a predetermined area of the video signal added to a vertical sync signal of the video signal; and
wherein the first selecting unit comprises:
a first initial value storing unit for storing a plurality of initial values for the selection of the predetermined area of the video signal and added to the horizontal sync signal;

a first multiplexer for selecting one of the initial values stored in the first initial value storing unit in response to a first externally transmitted control signal;
a first counter for generating a pulse of a predetermined period based on the initial value selected by the first multiplexer; and
a first circuit for performing a masking with respect to the video signal using the pulse outputted from the first counter and outputting only a desired area of the video signal.

11. An image displayer comprising:
a video signal selecting unit for selecting a video signal to display in a predetermined area of a display in response to externally transmitted control signals;
a buffer for receiving the video signal selected by the video signal selecting unit and re-ordering the video signal by an order of input; and
a scaler for sealing the video signal re-arranged by the buffer wherein the video signal selecting unit comprises:
a first selecting unit for selecting a predetermined area of the video signal added to a horizontal sync signal of the video signal; and
a second selecting unit for selecting a predetermined area of the video signal added to a vertical sync signal of the video signal; and
wherein the second selecting unit comprises:
a second initial value storing unit for storing a plurality of initial values for the selection of the predetermined area of the video signal and added to the vertical sync signal;
a second multiplexer for selecting one of the initial values stored in the second initial value storing unit in response to a second externally transmitted control signal;
a second counter for generating a pulse of a predetermined period according to the initial value selected by the second multiplexer; and
a second circuit for performing a masking with respect to the video signal using the pulse output from the second counter, thereby outputting only a desired area of the video signal.

12. The image displayer of claim 8, further comprising an On-Screen Display (QSD) unit for displaying a predetermined font on the display in response to the externally transmitted control signal so that the multi-screen function can be controlled on the OSD.

13. The image displayer of claim 10, wherein the first circuit is an exclusive-OR gate.

14. The image displayer of claim 11, wherein the second circuit is an exclusive-OR gate.

15. A multi-screen system comprising at least two image displayers, wherein each of said at least two image displayers comprises:
a display; and
a scaler for selecting a video signal corresponding to a predetermined area of the display based on an externally transmitted control signal, and enlarging the selected video signal according to a size of the display.

* * * * *